(12) United States Patent
Lee et al.

(10) Patent No.: US 8,836,895 B2
(45) Date of Patent: Sep. 16, 2014

(54) DISPLAY APPARATUS AND METHOD OF MANUFACTURING THE SAME

(75) Inventors: Hee-Keun Lee, Suwon-si (KR); Yeun-Tae Kim, Suwon-si (KR); Hae-Ju Yun, Hwaseong-si (KR); Son-Uk Lee, Seongnam-si (KR)

(73) Assignee: Samsung Display Co., Ltd., Suwon-Si, Yongin, Gyeonggi-Do ( * ) Notice: Subject to any disclaimer, the term of this patent is extended or adjusted under 35 U.S.C. 154(b) by 183 days.

(21) Appl. No.: 13/612,550

(22) Filed: Sep. 12, 2012

(65) Prior Publication Data

US 2013/0182203 A1 Jul. 18, 2013

(30) Foreign Application Priority Data

Jan. 18, 2012 (KR) ........................ 10-2012-0005733

(51) Int. Cl.
*G02F 1/1333* (2006.01)
(52) U.S. Cl.
USPC .............................................. 349/91; 349/90
(58) Field of Classification Search
USPC ..................................................... 349/90–91
See application file for complete search history.

(56) References Cited

U.S. PATENT DOCUMENTS 7,808,609 B2   10/2010   Kim et al.

FOREIGN PATENT DOCUMENTS

| KR | 10-2010-0136678 | 12/2010 |
| KR | 10-2011-0070173 | 6/2011 |
| KR | 10-2011-0078723 | 7/2011 |

OTHER PUBLICATIONS

English Abstract for Publication No. 10-2010-0136678.
English Abstract for Publication No. 10-2011-0070173.
English Abstract for Publication No. 10-2011-0078723.

*Primary Examiner* — Phu Vu
(74) *Attorney, Agent, or Firm* — F. Chau & Associates, LLC

(57) ABSTRACT

A display apparatus includes a base substrate, a pixel electrode, a plurality of capsular structures, a common electrode and a plurality of color filters. The base substrate includes a plurality of unit pixel regions. Each of the unit pixel regions has a plurality of sub pixel regions. A pixel electrode is formed in each of the sub pixel regions. A plurality of capsular structures is disposed on the base substrate. Each of the capsular structures is formed in each of the unit pixel regions and having a cavity. A common electrode is formed on the capsular structures. A plurality of color filters is formed on the capsular structures. Each of the color filters is formed in each of the sub pixel regions. An opening ratio of the sub pixel regions and light transmittance are relatively high.

21 Claims, 16 Drawing Sheets

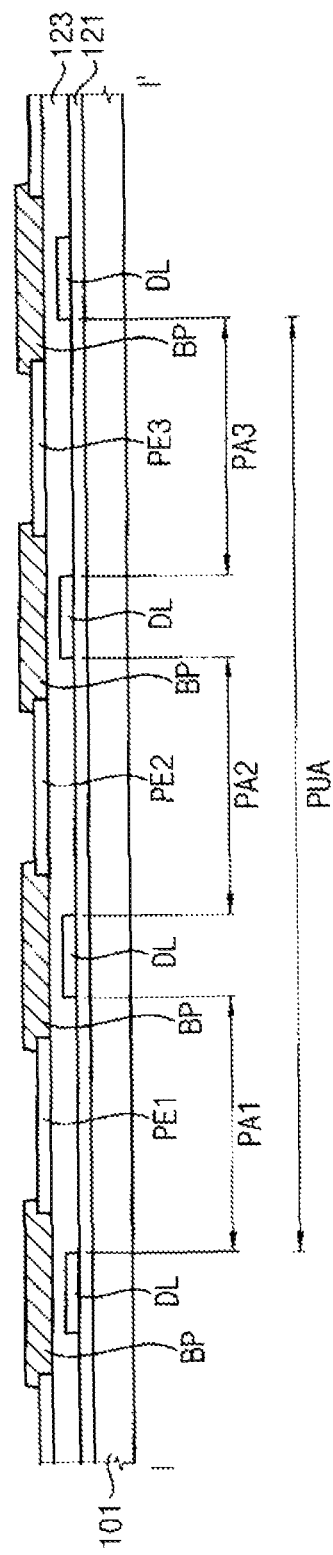

DISPLAY APPARATUS AND METHOD OF MANUFACTURING THE SAME

CROSS-REFERENCE TO RELATED APPLICATIONS

This application claims priority under 35 U.S.C. §119 to Korean Patent Application No. 10-2012-0005733, filed on Jan. 18, 2012 in the Korean Intellectual Property Office (KIPO), the contents of which are incorporated by reference herein in its entirety.

TECHNICAL FIELD

Exemplary embodiments of the present invention relate to a display apparatus. More particularly, exemplary embodiments of the present invention relate to a display apparatus and a method of manufacturing the display apparatus.

DISCUSSION OF THE RELATED ART

Generally, a liquid crystal display (LCD) apparatus includes a display substrate, a counter substrate and a liquid crystal layer interposed between the display substrate and the counter substrate. The display substrate includes a plurality of gate lines, a plurality of source lines, a plurality of thin film transistors and a plurality of pixel electrodes. The source lines cross the gate lines. The thin film transistors are connected to the gate and source lines. The pixel electrodes are connected to the thin film transistors. Each of the thin film transistors includes a gate electrode, a channel, a source electrode and a drain electrode. The channel is overlapped with the gate electrode. The source electrode is extended from the source line and is electrically connected to the channel. The drain electrode is spaced apart from the source electrode and is electrically connected to the channel. The counter substrate includes a common electrode. An electric field is formed between the pixel electrodes and the common electrode.

SUMMARY

Exemplary embodiments of the present invention provide a display apparatus having improved opening ratio.

Exemplary embodiments of the present invention also provide a method of manufacturing the above-mentioned display apparatus.

According to an exemplary embodiment of the present invention, a display apparatus includes a base substrate, a pixel electrode, a plurality of capsular structures, a common electrode and a plurality of color filters. The base substrate includes a plurality of unit pixel regions. Each of the unit pixel regions has a plurality of sub pixel regions. A pixel electrode is formed in each of the sub pixel regions. A plurality of capsular structures is disposed on the base substrate. Each of the capsular structures is formed in each of the unit pixel regions and having a cavity. A common electrode is formed on the capsular structures. A plurality of color filters is formed on the capsular structures. Each of the color filters is formed in each of the sub pixel regions.

In an exemplary embodiment, the display apparatus may further include a light blocking pattern formed between adjacent color filters.

In an exemplary embodiment, the light blocking pattern may include opaque organic material.

In an exemplary embodiment, the light blocking pattern may be disposed on the color filters.

In an exemplary embodiment, the light blocking pattern may include a first black matrix and a second black matrix. The first black matrix may be interposed between adjacent capsular structures, and partially overlapped with the color filters. The first black matrix may be disposed under the color filters. The second black matrix may be formed on the capsular structures, and may be partially overlapped with the color filters. The second black matrix may be disposed on the color filters.

In an exemplary embodiment, the light blocking pattern may be interposed between the capsular structures and the base substrate.

In an exemplary embodiment, the light blocking pattern may include metal.

In an exemplary embodiment, the sub pixel regions in each of the unit pixel regions may be arranged in a first direction, and the common electrode may be extended in the first direction and arranged in the second direction.

In an exemplary embodiment, a portion of the capsular structures adjacent to each other in the first direction may be connected to each other, and a portion of the capsular structures adjacent to each other in the second direction may be spaced apart from each other.

In an exemplary embodiment, the display apparatus may further include an alignment layer and a liquid crystal layer. The alignment layer may be disposed on an upper surface of the cavity. The liquid crystal layer may be disposed in the cavity and aligned by the alignment layer.

In an exemplary embodiment, the display apparatus may further include a protecting layer sealing the liquid crystal layer.

According to an exemplary embodiment of the present invention, a method of manufacturing a display apparatus is provided as follows. A plurality of pixel electrodes is formed in a plurality of sub pixel regions of a base substrate. A removing pattern is formed in each of a plurality of unit pixel regions. Each of the unit pixel regions has a plurality of the sub pixel regions. The removing pattern has substantially the same width as the unit pixel region. The removing pattern is extended in a longitudinal direction the crosses a horizontal direction of the unit pixel region. A plurality of capsular structures and a common electrode are formed on the removing pattern. The capsular structures are extended in a width direction of the removing pattern and spaced apart from each other in the longitudinal direction of the removing pattern. The removing patterns are removed forming cavities in the capsular structures. A liquid crystal layer is formed in the cavities of the capsular structures. A protecting layer is formed and seals the liquid crystal layer in the cavities of the capsular structures.

In an exemplary embodiment, the method may further include forming a plurality of color filters on the capsular structures corresponding to the sub pixel regions, respectively.

In an exemplary embodiment, the method may further include forming a light blocking pattern between adjacent color filters having different colors.

In an exemplary embodiment, the light blocking pattern may include opaque organic material.

In an exemplary embodiment, the light blocking pattern may be formed on the color filters, and partially overlapped with the color filters.

In an exemplary embodiment, the light blocking pattern may be formed by forming first and second black matrixes. Prior to forming the color filters, the first black matrix may be formed between adjacent capsular structures. After forming the color filters, the second black matrix may be formed on the capsular structures.

In an exemplary embodiment, the method may further include a light blocking pattern, prior to forming the pixel electrodes.

In an exemplary embodiment, the light blocking pattern may include metal.

In an exemplary embodiment, the method may further include forming an alignment layer in the cavities of the capsular structures, and forming a light crystal layer in the cavities in which the alignment layer is formed.

In an exemplary embodiment of the present invention, a display apparatus includes a base substrate. A plurality of unit pixel regions is defined on the base substrate. A plurality of pixel electrode corresponds to the plurality of unit pixel regions. Each of the unit pixel regions has a plurality of sub pixel regions. A plurality of capsular structures is disposed on the base substrate. Each capsular structure of the plurality of capsular structures is formed in each of the plurality of unit pixel regions. Each capsular structure of the plurality of capsular structures has a cavity, a common electrode formed on the plurality of capsular structures, and a plurality of color filters formed on the plurality of capsular structures. Each of the color filters of the plurality of color filters being formed in each of the sub pixel regions of the plurality of sub pixel regions.

According to the display apparatus and the method of manufacturing the display apparatus, each of the capsular structures is formed on a plurality of the sub pixel regions so that opening ratio is increased. Thus, light transmittance and luminance of the display apparatus may be increased.

BRIEF DESCRIPTION OF THE DRAWINGS

The above and other features and aspects of the present invention will become more apparent by describing in detailed exemplary embodiments thereof with reference to the accompanying drawings, in which:

FIGS. 8A to 8C are cross-sectional views illustrating the display apparatus shown in FIG. 7.

DETAILED DESCRIPTION

Hereinafter, exemplary embodiments of the present invention will be explained in detail with reference to the accompanying drawings.

Figure 1:
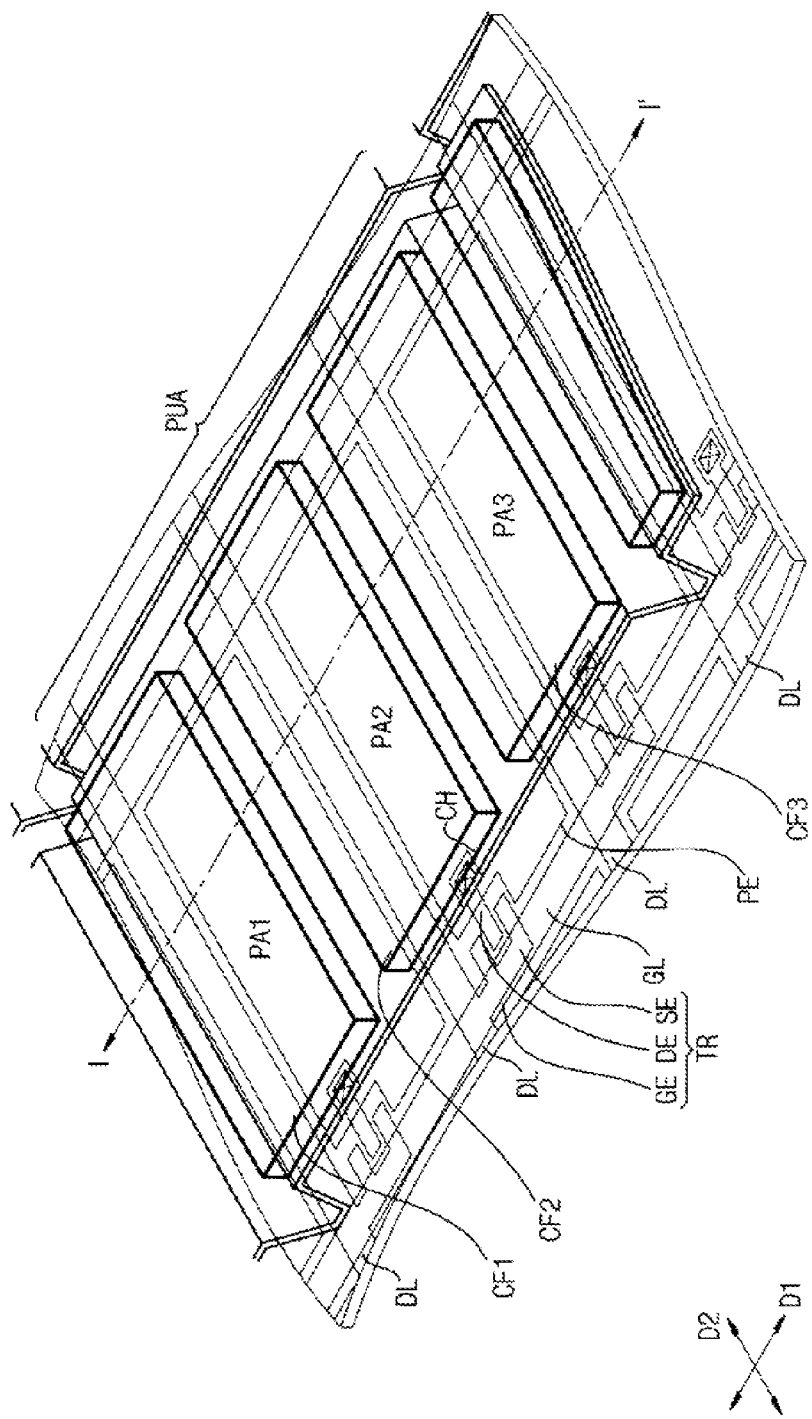
FIG. 1 is a partially cut out perspective view illustrating a display apparatus according to an exemplary embodiment of the present invention.
Figure 2:
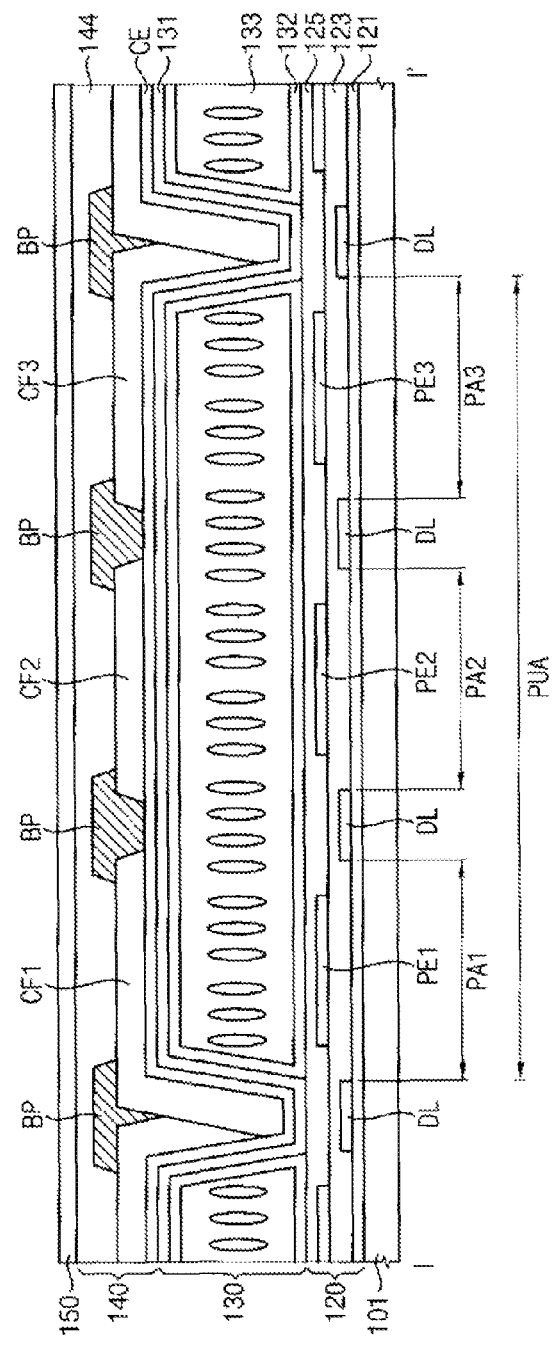
FIG. 2 is a cross-sectional view taken along a line I-I' shown in FIG. 1.

FIG. 1 is a partially cut out perspective view illustrating a display apparatus according to an exemplary embodiment of the present invention. FIG. 2 is a cross-sectional view taken along a line I-I' shown in FIG. 1.

Referring to FIGS. 1 and 2, the display apparatus includes a base substrate 101, a thin film transistor (TFT) array layer 120, a capsular structure layer 130, a color filter layer 140 and a protecting layer 150. The TFT array layer 120, the capsular structure layer 130, the color filter layer 140 and the protecting layer 150 are formed on the base substrate 101.

The TFT array layer 120 includes a plurality of gate lines GL, a plurality of date lines DL, a plurality of switching elements TR and a plurality of pixel electrodes PE.

The gate lines GL are extended in a first direction D1, and are arranged in a second direction D2 that crosses the first direction D1. The gate lines GL are electrically connected to gate electrodes GE of the switching elements TR.

The data lines DL are extended in the second direction D2 and are arranged in the first direction D1 that crosses the second direction D2. The data lines DL are electrically connected to source electrodes SE of the switching elements TR.

Each of the switching elements TR includes the gate electrode GE, the source electrode SE and a drain electrode DE. The gate electrode GE is electrically connected to one of the gate lines GL. The source electrode SE is electrically connected to one of the data lines DL. The drain electrode DE is spaced apart from the source electrode DW. The drain electrode DE of the switching element TR is electrically connected to one of the pixel electrodes PE through a contact hole CH.

Each of the pixel electrodes PE is disposed in each of sub pixel regions, and is electrically connected to each of the switching elements TR. The base substrate 101 has a plurality of unit pixel regions PUA. Each of the unit pixel regions PUA has a plurality of sub pixel regions PA1, PA2 and PA3. For example, each of the unit pixel regions PUA may have three sub pixel regions PA1, PA2 and PA3. In FIGS. 1 and 2, the unit pixel region PUA includes a first sub pixel region PA1, a second sub pixel region PA2 and a third sub pixel region PA3. A first sub pixel electrode PE1 is disposed in the first sub pixel region PA1. A second sub pixel electrode PE2 is disposed in the second sub pixel region PA2. A third sub pixel electrode PE3 is disposed in the third sub pixel region PA3.

The sub pixel regions PA may be arranged in a matrix shape having a plurality of columns and rows. Each of the sub pixel regions PA may have a width side and a longitudinal side. For example, the width side and the longitudinal side of the sub pixel region PA may be substantially parallel with the first and second directions, respectively. Alternatively, the sub pixel regions PA may have various shapes and arrangements. The sub pixel regions PA may have a square shape, a circular shape, an elliptical shape, a stripe shape, a V-shape, Z-shape, etc.

For example, the display apparatus may be a transmissive type display apparatus, and the pixel electrodes PE may include transparent conductive material. The liquid crystal layer may include liquid crystal molecules. In an exemplary embodiment, the display apparatus may be a reflective type display apparatus and the pixel electrodes PE may include opaque conductive material. The liquid crystal layer may be substituted by an electrophoretic display apparatus, an organic light emitting display (OLED) apparatus, etc. Alternatively, the liquid crystal layer may be substituted by oil, hydrophobic material, or hydrophilic material.

The TFT array layer 120 may further include a first insulating layer 121, a second insulating layer 123 and a third insulating layer 125. The first insulating layer 121 is formed on the base substrate 101 covering the gate lines GL and the gate electrodes GE that are formed from a first metal layer. The second insulating layer 123 is formed on the base substrate and covers the data lines DL, the source electrodes SE and the drain electrodes DE that are formed from a second metal layer. The third insulating layer 125 is formed on the base substrate 101 and covers the pixel electrodes PE. The first, second and third insulating layers 121, 123 and 125 may include silicon nitride (SiNx), silicon oxide (SiOx), etc. The first, second and third insulating layers 121, 123 and 125 may have a single layered structure or a multi layered structure formed from different materials and using different processes.

The capsular structure layer 130 may include a plurality of capsular structures 131, an alignment layer 132, a liquid crystal layer 133 and a common electrode CE.

Each of the capsular structures 131 may have a cavity in the form of a tunnel shape, and may be arranged in each of the unit pixel regions PUA. The capsular structure 131 may have a single layered structure having silicon nitride SiNx. Alternatively, the capsular structure 131 may have a multi layered structure formed from different materials and using different processes.

For example, the capsular structures 131 may be extended in the first direction D1 and arranged in the second direction D2. In FIGS. 1 and 2, the capsular structures 131 may be spaced apart from each other in the second direction D2. Width and length of each of the capsular structures 131 may be substantially parallel with the first direction D1 and the second direction D2, respectively. The width of the capsular structure 131 may correspond to a summation of widths of the first, second and third sub pixel regions PA1, PA2 and PA3. The length of the capsular structure 131 may correspond to a length of each of the first, second and third sub pixel regions PA1, PA2 and PA3. The capsular structures 131 are spaced apart from each other in the second direction D2, so that the alignment layer 132 and the liquid crystal layer 133 may be formed in the cavities of the capsular structures 131.

The alignment layer 132 is formed on an inner surface of the cavity of the capsular structure 131. The alignment layer 132 is disposed on an upper surface of the base substrate 101 on which the first, second and third pixel electrodes PE1, PE2 and PE3 are formed. The cavity of the capsular structure 131 has the inner surface including an inner upper surface and an inner side surface.

The liquid crystal layer 133 is disposed in the cavity defined by the capsular structure 131. The liquid crystal layer 133 may be aligned by the alignment layer 132.

The common electrode CE is formed on an outer surface of the capsular structures 131. The common electrode CE may cover the entire base substrate 101. The common electrode CE may cover the outer surface of the capsular structures 131. The outer surface of the capsular structures 131 may have an outer upper surface and an outer side surface.

The color filter layer 140 may include a plurality of color filters CF1, CF2 and CF3, a light blocking pattern BP and a planarizing layer 144. The color filters CF1, CF2 and CF3, the light blocking pattern BP and the planarizing layer 144 may be formed on the capsular structure layer 130.

The first, second and third color filters CF1, CF2 and CF3 correspond to the first, second and third sub pixel regions PA1, PA2 and PA3 of each of the unit pixel regions PUA, respectively.

The light blocking pattern BP blocks light. The light blocking pattern BP may be interposed between adjacent color filters of the first, second and third color filters CF1, CF2 and CF3.

The planarizing layer 144 may be disposed on the first, second and third color filters CF1, CF2 and CF3 and the light blocking pattern BP and may planarize a surface of the display apparatus.

The protecting layer 150 is formed on and protects the planarizing layer 144 and protects the display apparatus and seals the liquid crystal layer 133 received in the cavity. The protecting layer 150 may have a single layered structure including silicon nitride (SiNx). Alternatively, the protecting layer 150 may have a multilayered structure formed from different layers and using different processes.

According to an exemplary embodiment, the capsular structures 131 are arranged in the unit pixel regions PUA, respectively, so that opening ratio of the display apparatus may be increased.

FIGS. 3A to 3E are cross-sectional views illustrating a method of manufacturing the display apparatus shown in FIGS. 1 and 2.

Figure 3A:
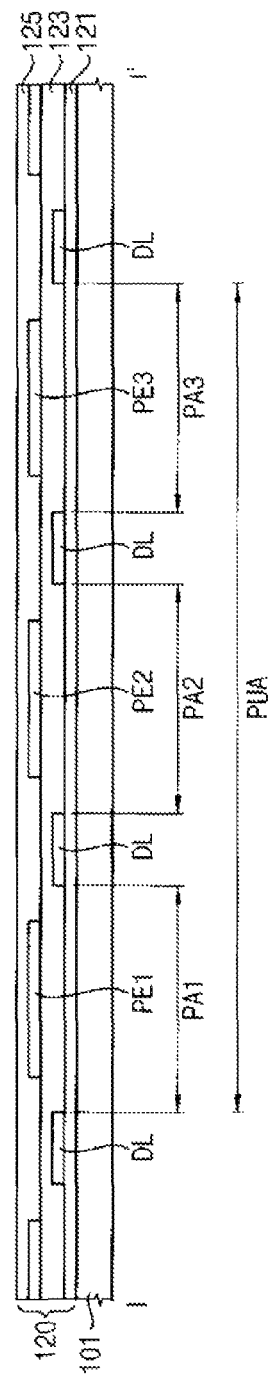
FIGS. 3A to 3E are cross-sectional views illustrating a method of manufacturing the display apparatus shown in FIGS. 1 and 2.

Referring to FIGS. 1, 2 and 3A, the TFT array layer 120 is formed on the base substrate 101.

For example, the first metal layer is formed on the base substrate 101. The first metal layer is patterned and a first metal pattern is formed including the gate lines GL and the gate electrodes GE. The first metal layer may include chromium, aluminum, tantalum, molybdenum, titanium, tungsten, copper, silver, an alloy thereof, etc. Alternatively, the first metal layer may have a single layered structure or a multi-layered structure including at least two layers having different physical characteristics.

The first insulating layer 121 is formed on the base substrate 101 on which the first metal pattern is formed. The first insulating layer 121 may include silicon nitride (SiNx), silicon oxide (SiOx), etc. The first insulating layer 121 may have a single layered structure, a multi-layered structure formed from different materials and using different processes.

A semiconductor layer is formed on the base substrate 101 on which the first insulating layer 121 is formed. The semiconductor layer is patterned such that active patterns of the switching elements TR are formed.

A second metal layer is formed on the base substrate 101 on which the active patterns are formed. The second metal layer is patterned and a second metal pattern is formed including the data lines DL, the source electrodes SE and the drain electrodes DE. The second metal layer may include chromium, aluminum, tantalum, molybdenum, titanium, tungsten, copper, silver, an alloy thereof, etc. Alternatively, the second metal layer may have a single layered structure or a multi-layered structure including at least two layers having different physical characteristics.

Alternatively, the active patterns and the second metal pattern may be formed using one slit mask.

The second insulating layer 123 is formed on the base substrate 101 on which the second metal pattern is formed. The second insulating layer 123 may include silicon nitride (SiNx), silicon oxide (SiOx), etc. The second insulating layer 123 may have a single layered structure, a multi-layered structure formed from different materials and using different processes.

The second insulating layer 123 is etched and the contact hole CH through which each of the drain electrodes DE is exposed is formed.

A pixel electrode layer is formed on the base substrate 101 on which the contact hole CH is formed. The pixel electrode layer is patterned and the pixel electrodes PE1, PE2 and PE3 are formed in the sub pixel regions. When the display apparatus is the transmissive type display apparatus, the pixel electrode layer may include transparent conductive material.

Examples of the transparent conductive material that may be used for the pixel electrode layer may include indium tin oxide (ITO), indium zinc oxide (IZO), etc. Alternatively, the display apparatus is the reflective type display apparatus, and the pixel electrode layer may include opaque conductive material such as aluminum, aluminum alloy, etc.

The third insulating layer 125 is formed on the base substrate 101 on which the pixel electrodes PE1, PE2 and PE3 are formed. The third insulating layer 125 may include silicon nitride (SiNx), silicon oxide (SiOx), etc. The third insulating layer 125 may have a single layered structure, a multi-layered structure formed from different materials and using different processes.

When the pixel electrodes PE1, PE2 and PE3 are formed on the base substrate 101, the TFT array layer 120 of the display apparatus may be completed.

Figure 3B:
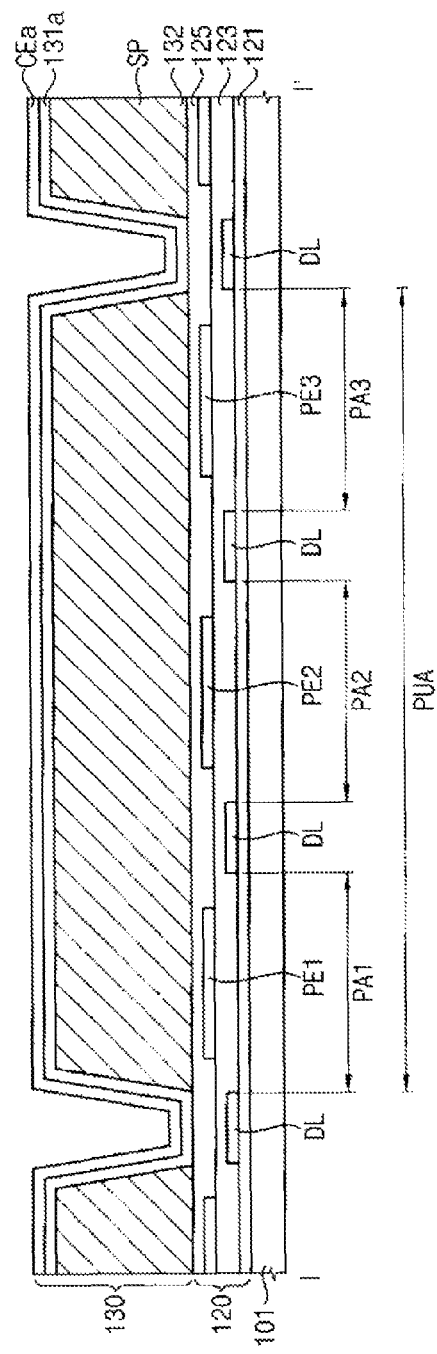

Referring to FIGS. 2 and 3B, a removing layer is formed on the base substrate 101 on which the TFT array layer 120 is formed. The removing layer may include high polymer. Examples of the high polymer that can be used for the removing layer may include benzocyclobutene (BCB), acryl based resin, etc. Alternatively, the removing layer may include various materials that may be removable during the manufacturing process.

The removing layer is patterned and a plurality of removing patterns SP is formed. The removing patterns SP are extended in the second direction D2, and are arranged in the first direction. A side of each of the removing patterns SP in the first direction D1 has substantially the same length as a side of each of the unit pixel regions PUA in the first direction D1. The width of each of the removing patterns corresponds to a summation of the widths of the first, second and third sub pixel regions PA1, PA2 and PA3. For example, the width of each of the removing patterns may be substantially the same as the summation of the widths of the first, second and third sub pixel regions PA1, PA2 and PA3.

A capsular insulating layer 131a is formed on the base substrate 101 on which the removing patterns SP are formed. The capsular insulating layer 131a may include silicon nitride (SiNx), silicon oxide (SiOx), etc. The capsular insulating layer 131 may have a single layered structure, a multi-layered structure formed from different materials and using different processes.

A transparent conductive layer CEa is formed on the base substrate 101 on which the capsular insulating layer 131a is formed. The transparent conductive layer CEa may include transparent conductive material. Examples of the transparent conductive material that may be used for the transparent conductive layer CEa may include indium tin oxide (ITO), indium zinc oxide (IZO), etc.

Figure 3C:
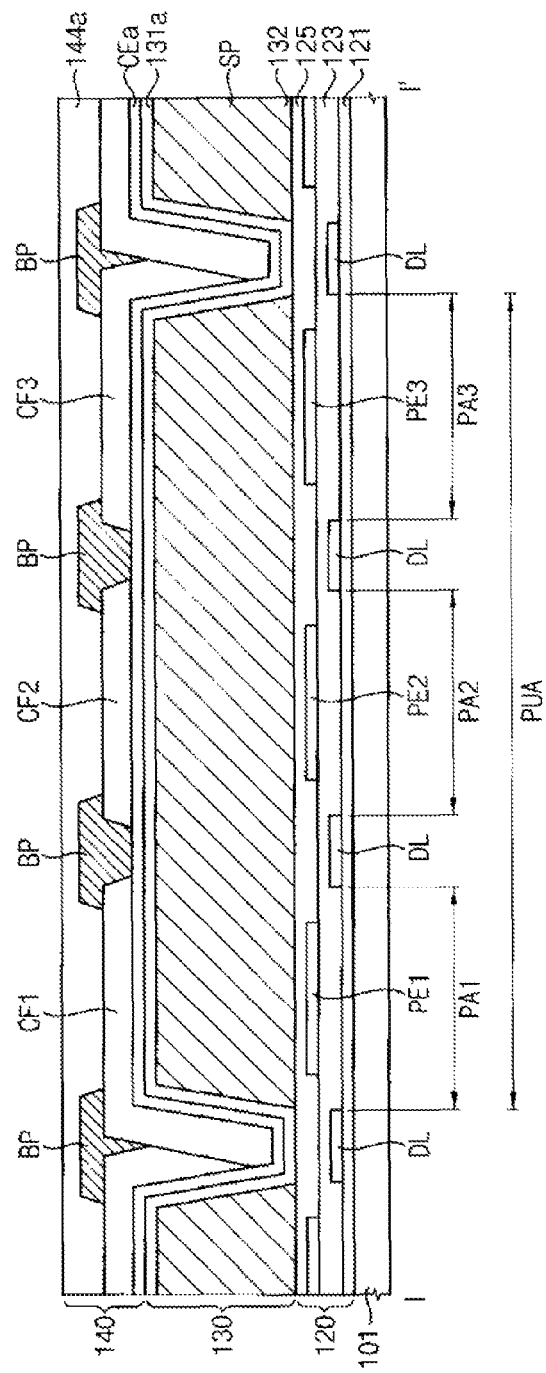

Referring to FIGS. 2 and 3C, a first color photoresist layer is formed on the base substrate 101 on which the transparent conductive layer CEa is formed. The first color photoresist layer is patterned through a photo process and the first color filter CF1 is formed in the first sub pixel region PA1 of the unit pixel region PUA. The first color filter CF1 has an island shape.

A second color photoresist layer is formed on the base substrate 101 on which the first color filter CF1 is formed. The second color photoresist layer is patterned through a photo process and the second color filter CF2 is formed in the second sub pixel region PA2 of the unit pixel region PUA. The second color filter CF2 has an island shape.

A third color photoresist layer is formed on the base substrate 101 on which the first and second color filters CF1 and CF1 are formed. The third color photoresist layer is patterned through a photo process and the third color filter CF3 is formed in the third sub pixel region PA3 of the unit pixel region PUA. The third color filter CF1 has an island shape.

The first, second and third color filters CF1, CF2 and CF3 are discontinuously formed in the second direction D2. Adjacent color filters of the first, second and third color filters CF1, CF2 and CF3 may be partially overlapped with each other in the first direction D1. The first, second and third color filters CF1, CF2 and CF3 may be formed through various methods such as an inkjet printing.

A light blocking layer is formed on the base substrate 101 on which the first, second and third color filters CF1, CF2 and CF3 are formed. The light blocking layer is patterned and the light blocking pattern BP is formed. The light blocking layer may include opaque organic material, and may be patterned through a photo process. The light blocking pattern BP may be overlapped with end portions of the first, second and third color filters CF1, CF2 and CF3 in the first direction D1.

The planarizing insulating layer 144a is formed on the base substrate 101 on which the light blocking pattern BP and the first, second and third color filters CF1, CF2 and CF3 are formed. The planarizing insulating layer 144a planarizes an upper surface of the display apparatus. The planarizing insulating layer 144a may include silicon nitride (SiNx), silicon oxide (SiOx), etc. The planarizing insulating layer 144a may have a single layered structure, a multi-layered structure formed from different materials and using different processes.

The planarizing insulating layer 144a, the transparent conductive layer CEa and the capsular insulating layer 131a are patterned through a photolithography process and the planarizing layer 144, the common electrode CE and the capsular structures 131 that are extended in the first direction D1 are formed. For example, the planarizing layer 144, the common electrode CE and the capsular structures 131 are patterned in substantially every column of the sub pixels so that the planarizing layer 144, the common electrode CE and the capsular structures 131 are extended in the first direction D1 and arranged in the second direction D2.

The removing patterns SP are extended in the second direction D2 by the planarizing layer 144, the common electrode CE and the capsular structures 131 that are patterned in every column of the sub pixels, and are arranged in the first direction D1. The removing patterns SP partially expose end portions of the sub pixel regions in the second direction. For example, the removing patterns SP partially expose a region corresponding to the gate lines GL.

The planarizing layer 144 covers end portions of the color filters in the second direction D2. The color filters are disposed in the sub pixel regions, respectively. Thus, the planarizing layer 144 protects the color filters CF1, CF2 and CF3 from the following step of removing the removing patterns SP.

Figure 3D:
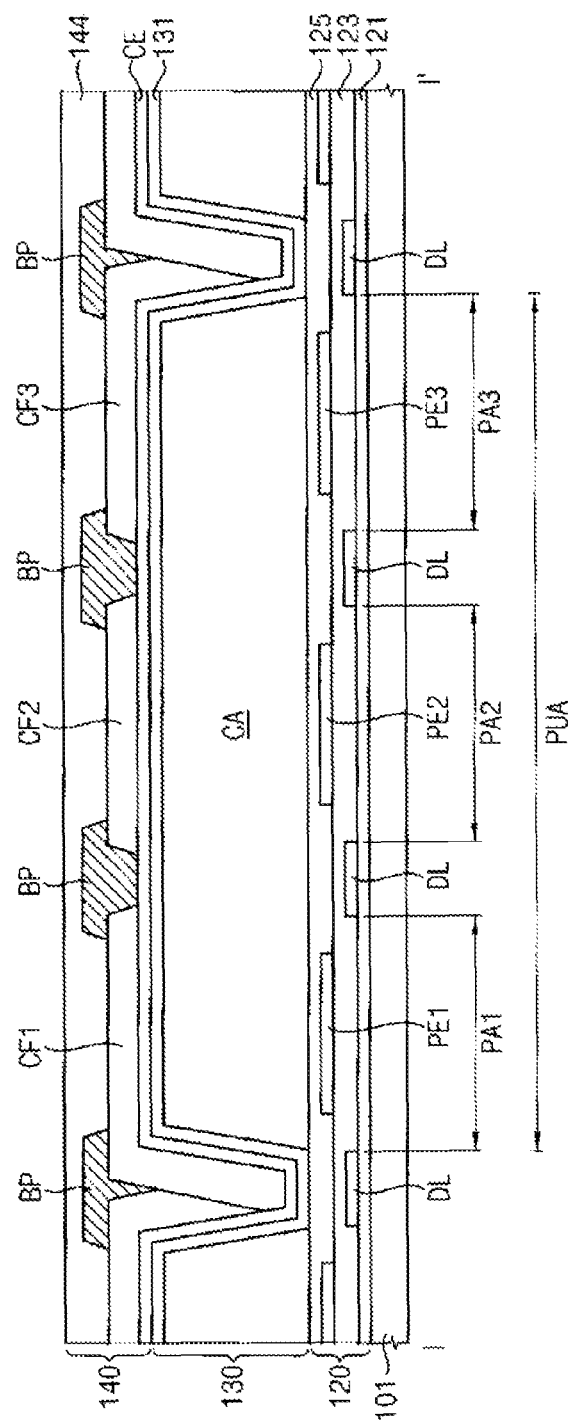

Referring to FIGS. 2 and 3D, the partially exposed removing patterns SP are removed through a plasma process. The removing patterns SP are removed from the exposed end portions of the removing patterns SP through an anisotropic plasma process, so that the entire removing patterns SP are removed. Thus, the removing patterns SP in the capsular structures 131 are removed forming the cavities CA defined by the capsular structures 131.

In an exemplary embodiment, the plasma process includes the anisotropic plasma process for removing the organic material. Alternatively, the plasma process may have various methods such as a microwave $O_2$ plasma process. In the microwave $O_2$ plasma process, stage temperature, chamber pressure, and/or plasma gas may be adjusted and only the organic insulating material may be removed. Thus, the third insulating layer 125, the capsular structures 131 and the planarizing layer 144 including inorganic material would not be removed during the microwave $O_2$ plasma process. The microwave $O_2$ plasma process may be performed at a temperature of about 100° C. to about 300° C., an $O_2$ flow rate of about 5,000 sccm to about 10,000 sccm, an $N_2H_2$ flow rate of about 100 sccm to about 1,000 sccm, a chamber pressure of about 2 Torr, and an electric power of about 100 W to about 4,000 W.

In an exemplary embodiment, the capsular structures 131 correspond to the unit pixel regions, respectively, so that the cavities CA are formed in the unit pixel regions, respectively. Alternatively, each of the capsular structures may correspond to two sub pixel regions, or each of the capsular structures may correspond to more than or equal to four sub pixel regions. Also, each of the cavities may correspond to two sub pixel regions, or each of the cavities may correspond to more than or equal to four sub pixel regions.

Figure 3E:
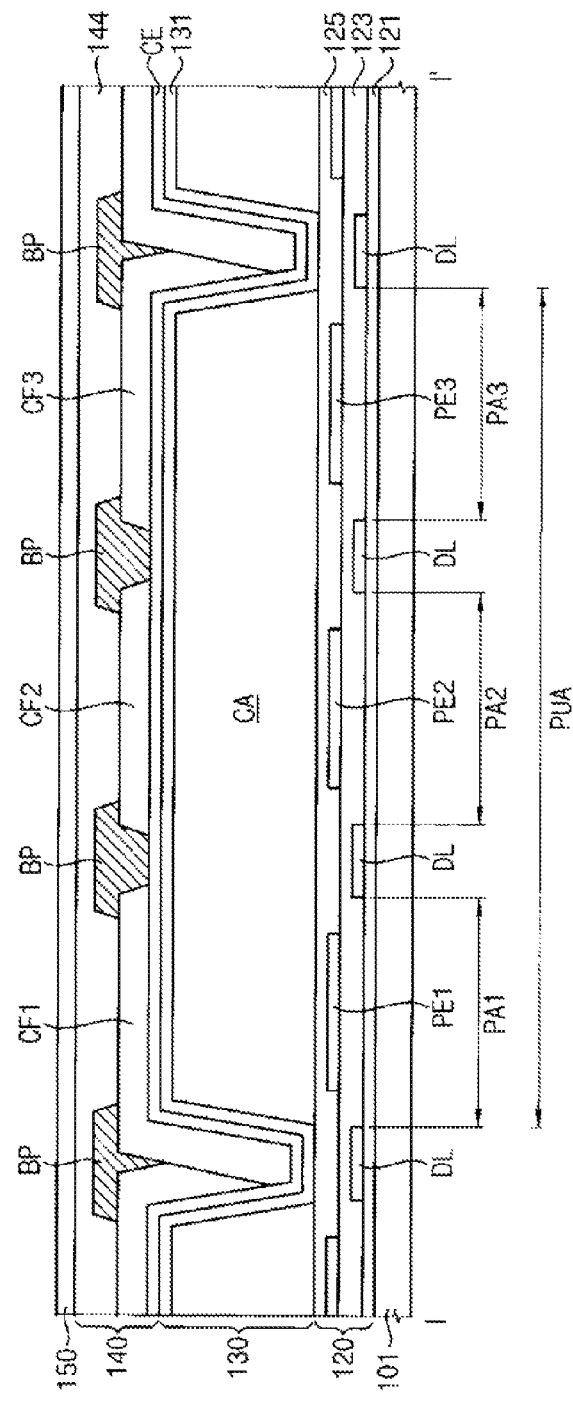

Referring to FIGS. 2 and 3E, the alignment layer 132 is formed on the base substrate 101 on which the cavities CA are formed.

The alignment layer 132 is formed on the inner surface of the cavities CA that are defined by the capsular structures 131. For example, the alignment layer 132 is formed on the inner upper surface and the inner side surface of the capsular structures 131. The alignment layer 132 may be formed using an alignment liquid. The alignment liquid may be formed by mixing alignment material with solvent. For example, the alignment material may include polyimide. The alignment liquid has fluidity. Thus, when the alignment liquid is transported adjacent to the capsular structures 131, the alignment liquid moves in the cavities CA by a capillary phenomenon. The alignment liquid may be transported adjacent to the capsular structures 131 through an inkjet printing process using a micropipette, and the alignment liquid may be injected into the cavities CA through a vacuum injection. The solvent is removed from the alignment liquid in the cavities CA. The solvent may be removed through a heating process or drying at a room temperature.

The liquid crystal layer 133 is formed on the base substrate 101 having the alignment layer 132. The liquid crystals are transported adjacent to the capsular structures 131, and the liquid crystals move in the cavities CA by the capillary phenomenon. The liquid crystals may be transported adjacent to the capsular structures 131 through the inkjet printing process using the micropipette, and the liquid crystals may be injected into the cavities through a vacuum injection. For example, a portion of the base substrate 101 having the cavities CA of the capsular structures 131 is dipped in the liquid crystals received in a container, and a chamber in which the base substrate 101 and the liquid crystals is decompressed. Thus, the liquid crystals are injected in the cavities CA through the capillary phenomenon.

The protecting layer 150 is formed surrounding the liquid crystal layer 133 that is filled in the cavities CA of the capsular structures 131. The protecting layer 150 seals an inlet of the cavities CA through which the liquid crystals are injected.

Alternatively, a first polarizer (not shown) having a first polarizing axis may be formed on a lower substrate of the base substrate 101. A second polarizer (not shown) having a second polarizing axis substantially perpendicular to the first polarizing axis may be formed on an upper surface of the protecting layer 150.

Figure 4A:
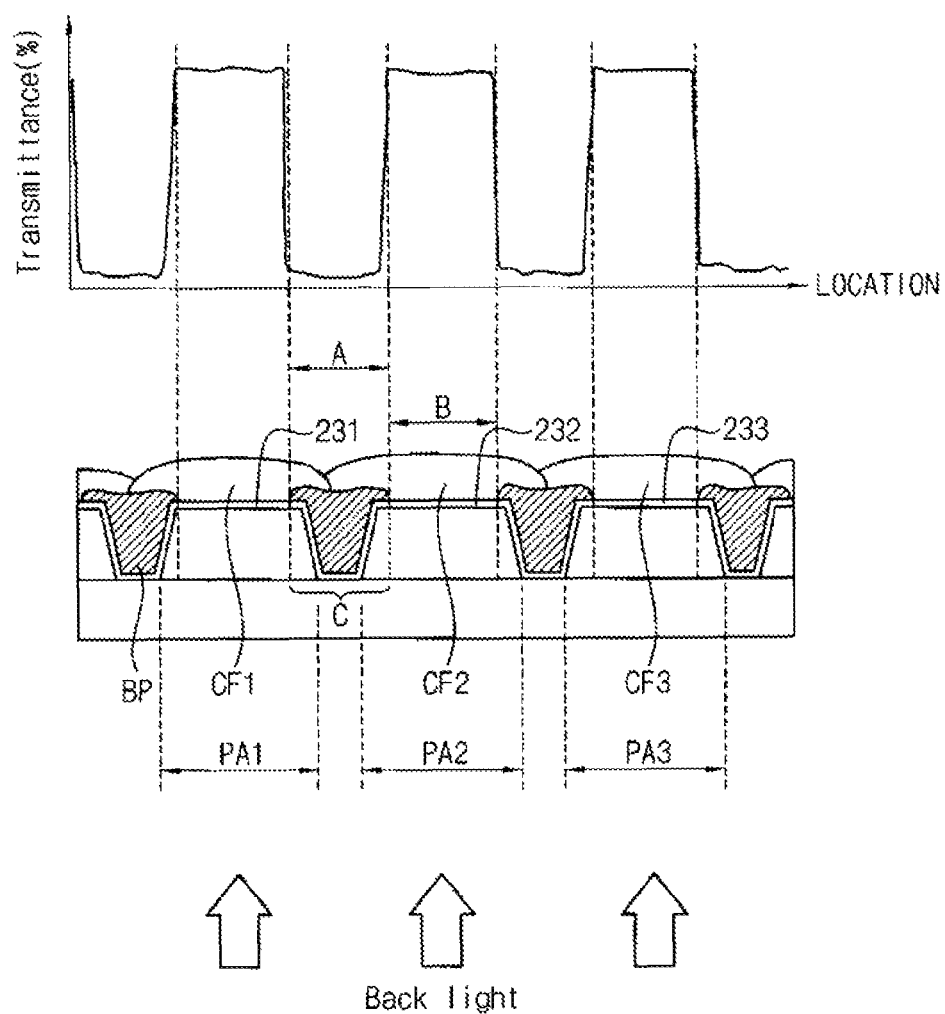
FIG. 4A is a cross-sectional view illustrating a display apparatus and light transmittance of the display apparatus according to an exemplary embodiment of the present invention.
Figure 4B:
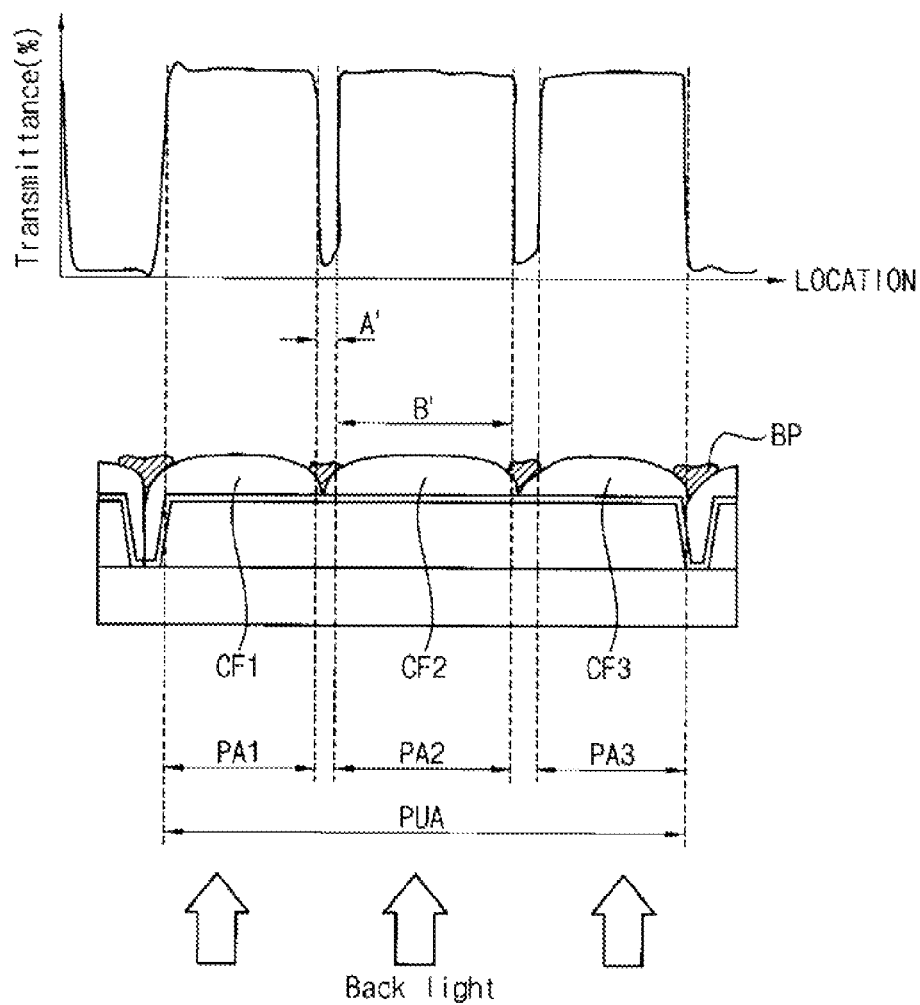
FIG. 4B is a cross-sectional view illustrating the display apparatus shown in FIGS. 1 and 2 and light transmittance of the display apparatus shown in FIGS. 1 and 2.

FIG. 4A is a cross-sectional view illustrating a display apparatus and light transmittance of the display apparatus according to an exemplary embodiment of the present invention. FIG. 4B is a cross-sectional view illustrating the display apparatus shown in FIGS. 1 and 2 and light transmittance of the display apparatus shown in FIGS. 1 and 2.

Referring to FIG. 4A, the display apparatus includes a plurality of capsular structures arranged in a plurality of sub pixel regions, respectively. Each of the capsular structures may have a tunnel shape. In FIG. 4A, first, second and third capsular structures 231, 232 and 233 are disposed in first, second and third sub pixel regions PA1, PA2 and PA3, respectively.

The light blocking patterns BP are disposed between the first and second capsular structures 231 and 232 corresponding to the first and second sub pixel regions PA1 and PA2, between the second and third capsular structures 232 and 233 corresponding to the second and third sub pixel regions PA2 and PA3, and the first and third capsular structures 231 and 233 corresponding to the first and third sub pixel regions PA1 and PA3.

In FIG. 4A, the light blocking patterns BP have same shape and size, so the size of the light blocking patterns BP is increased. For example, the first and second capsular structures 231 and 232 are spaced apart from each other, so that size of a light blocking region 'A' corresponding to the light blocking patterns BP is increased. Thus, a first opening region B of the second sub pixel region PA2 is decreased by the first light blocking region 'A' having the increased size.

Referring to FIG. 4B, the display apparatus includes a plurality of capsular structures arranged in a plurality of unit pixel regions, respectively. Each of the unit pixel regions includes first, second and third sub pixel regions PA1, PA2 and PA3. The capsular structures are disposed in the unit pixel regions, respectively.

The light blocking patterns BP are disposed on longitudinal sides of the first, second and third sub pixel regions PA1, PA2 and PA3. For example, a portion of the light blocking patterns BP are disposed between the first and second sub pixel regions PA1 and PA2, and between the second and third sub pixel regions PA2 and PA3. A remaining portion of the light blocking pattern BP is disposed between the first sub pixel region PA1 of the unit pixel region PUA and a third sub pixel region of adjacent unit pixel region.

In FIG. 4B, the light blocking patterns BP disposed between the first and second sub pixel regions PA1 and PA2 and between the second and third sub pixel regions PA2 and PA3 are different from the light blocking pattern BP disposed between the first sub pixel region PA1 of the unit pixel region PUA and the third sub pixel region of the adjacent unit pixel region. The size of a second light blocking region A' between the first and second sub pixel regions PA1 and PA2 and between the second and third sub pixel regions PA2 and PA3 is smaller than the light blocking region A (shown in FIG. 4A). Thus, a second opening ratio B' in the second sub pixel region B' is greater than the first opening ratio B (shown in FIG. 4A).

Therefore, the capsular structures are disposed between adjacent unit pixel regions each of which having a plurality of the sub pixel regions, so that the opening ratio of the sub pixel regions may be increased. Thus, opening ratio of the display apparatus may be increased.

Figure 5:
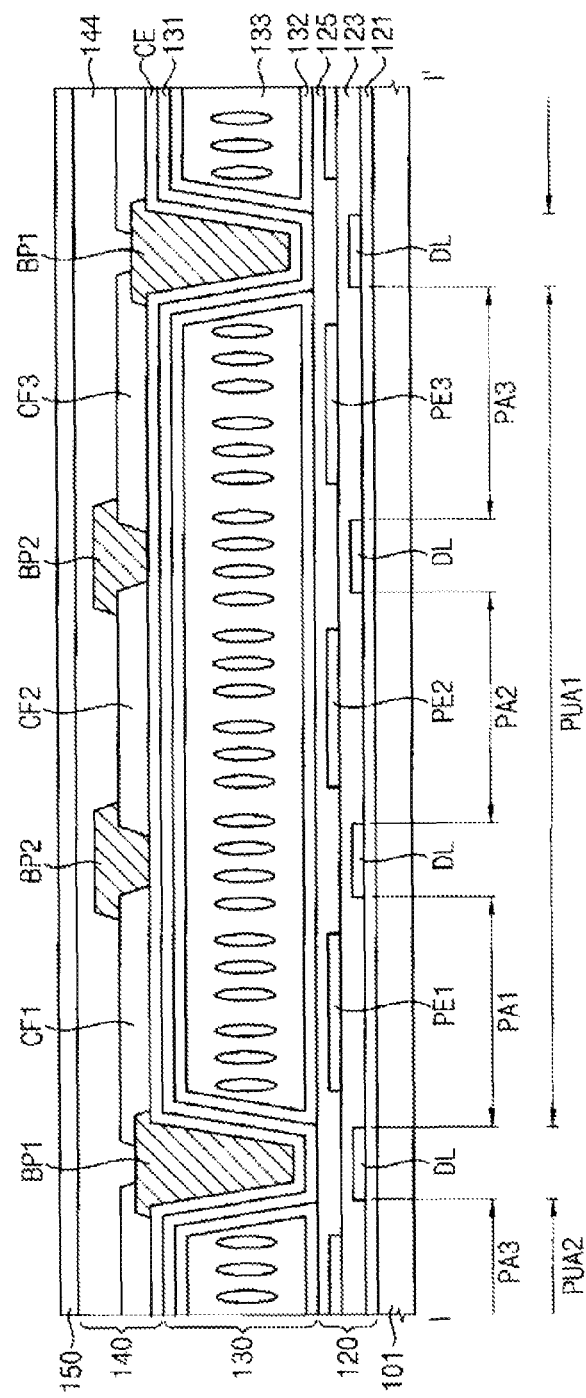
FIG. 5 is a cross-sectional view illustrating a display apparatus according to an exemplary embodiment of the present invention.

FIG. 5 is a cross-sectional view illustrating a display apparatus according to an exemplary embodiment of the present invention.

A display apparatus according to an exemplary embodiment is substantially the same as the display substrate discussed above with respect to FIGS. 1 and 2 excepting for first and second light blocking patterns BP1 and BP2, and thus the same reference numerals may be used to refer to the same or like parts as those described above with respect to FIGS. 1 and 2 and any repetitive explanation concerning the above elements may be omitted.

Referring to FIGS. 1 and 5, the display apparatus includes a base substrate 101, a thin film transistor (TFT) array layer 120, a capsular structure layer 130, a color filter layer 140 and a protecting layer 150. The TFT array layer 120, the capsular structure layer 130, the color filter layer 140 and the protecting layer 150 are formed on the base substrate 101. The TFT array layer 120, the capsular structure layer 130, the color filter layer 140 and the protecting layer 150 of FIG. 5 are substantially the same as those shown in FIGS. 1 and 2, and thus any repetitive explanation concerning the above elements may be omitted.

The color filter layer 140 may include a first light blocking pattern BP1, a plurality of color filters CF1, CF2 and CF3, a second light blocking pattern BP2 and a planarization layer 144. The color filter layer 140 may further include a plurality of the first light blocking patterns BP1 and a plurality of the second light blocking patterns BP1 The color filter layer 140 may be disposed on the capsular structure layer 130. The color filters CF1, CF2 and CF3 and the planarization layer 144 are substantially the same as those shown in FIGS. 1 and 2, and thus any repetitive explanation concerning the above elements may be omitted.

The first light blocking pattern BP1 is disposed between adjacent capsular structures 131 corresponding to unit pixel regions PUA, respectively. For example, the first light blocking pattern BP1 is disposed between a first sub pixel region PA1 of a first unit pixel region PUA1 and a third sub pixel region PA3 of a second sub pixel region PUA2 adjacent to the first unit pixel region PUA1.

The second light blocking patterns BP2 are disposed on the capsular structures 131. The second light blocking patterns BP2 are disposed in the unit pixel region PUA1 and PUA2, and are disposed between the sub pixel regions PA1, PA2 and PA3. For example, the second light blocking patterns BP2 are between the first and second sub pixel regions PA1 and PA2 and between the second and third sub pixel regions PA2 and PA3.

Figure 6A:
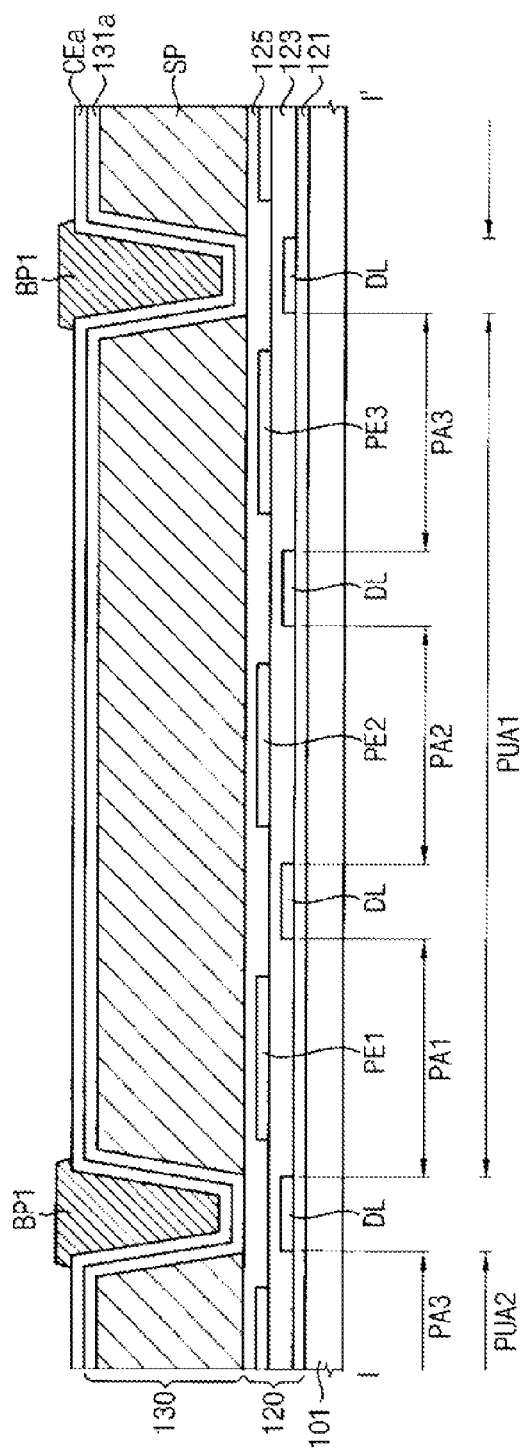
FIGS. 6A and 6B are cross-sectional views illustrating the display apparatus shown in FIG. 5.
Figure 6B:
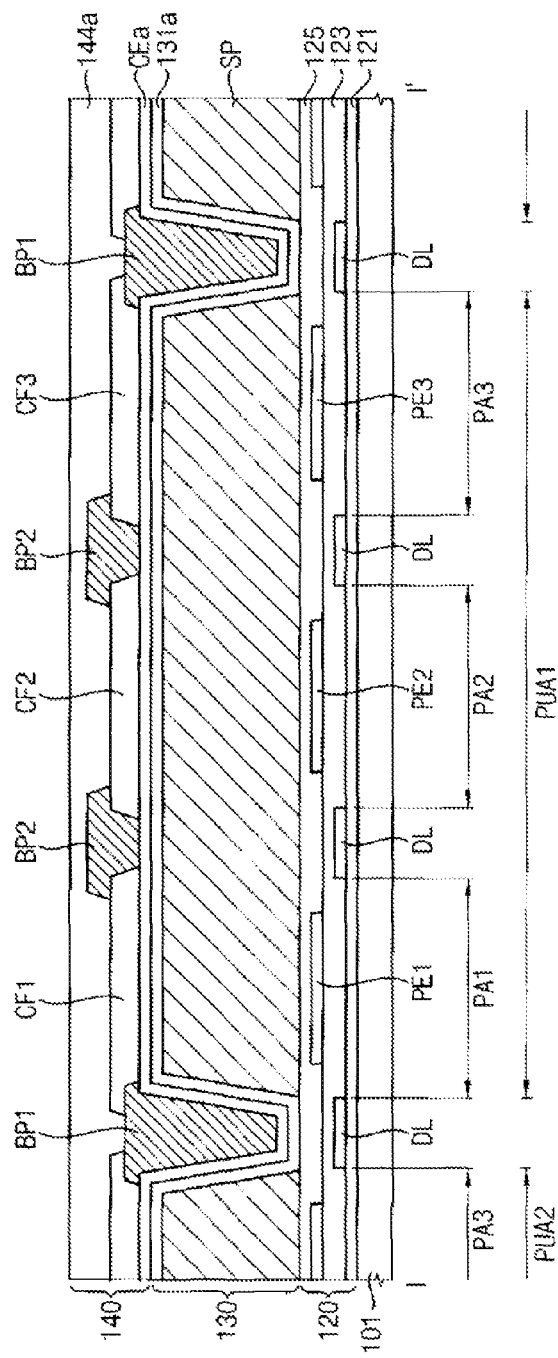

FIGS. 6A and 6B are cross-sectional views illustrating the display apparatus shown in FIG. 5. A method according to an exemplary embodiment is substantially the same as the method discussed above with respect to FIGS. 1 to 3E excepting for first and second light blocking patterns BP1 and BP2, and thus the same reference numerals may be used to refer to the same or like parts as those described with respect to FIGS. 1 to 3E and any repetitive explanation concerning the above elements may be omitted.

Referring to FIGS. 1, 5 and 6A, the TFT array layer 120 is formed on the base substrate 101.

A plurality of removing patterns SP, a capsular structure layer 131a and a transparent conductive layer CEa are formed on the TFT array layer 120.

A first light blocking layer is formed on the base substrate 101 on which the transparent conductive layer CEa is formed. The first light blocking layer is patterned and the first light blocking patterns BP1 are formed. The first light blocking layer may include opaque organic material, and may be patterned through a photo process. The first light blocking patterns BP1 are disposed between adjacent capsular structures 131 disposed in the unit pixel regions PUA, respectively. For example, the first light blocking patterns VP1 are disposed between the first sub pixel region PA1 of the first unit pixel region PUA1 and the third sub pixel region PA3 of the second unit pixel region PUA2 adjacent to the first unit pixel region PUA1.

Referring to FIGS. 5 and 6B, first, second and third color filters CF1, CF2 and CF3 are formed in the first, second and third sub pixel regions PA1, PA2 and PA3, respectively, on the base substrate 101 on which the first light blocking patterns BP1 are formed.

A second light blocking layer is formed on the base substrate 101 on which the first, second and third color filters CF1, CF2 and CF3 are formed. The second light blocking layer is patterned and the second light blocking patterns BP2 are formed. The second light blocking layer may include opaque organic material, and may be patterned through a photo process.

The second light blocking patterns BP2 are disposed on the capsular insulating layer 131a. The second light blocking patterns BP2 are spaced apart from each other. For example, the second light blocking patterns BP2 are disposed between the first and second sub pixel regions PA1 and PA2, and between the second and third sub pixel regions PA2 and PA3.

The planarizing layer 144a is formed on the base substrate 101 on which the second light blocking patterns BP2 are formed.

Subsequent processes for manufacturing the display apparatus of FIG. 5 are substantially the same as shown in FIGS. 3D and 3E. Thus, any repetitive explanations concerning the processes may be omitted.

According to an exemplary embodiment, the capsular structures 131 are disposed in the unit pixel regions, respectively, so that opening ratio of the sub pixel region may be increased. Thus, the opening ratio of the display apparatus may be increased.

Figure 7:
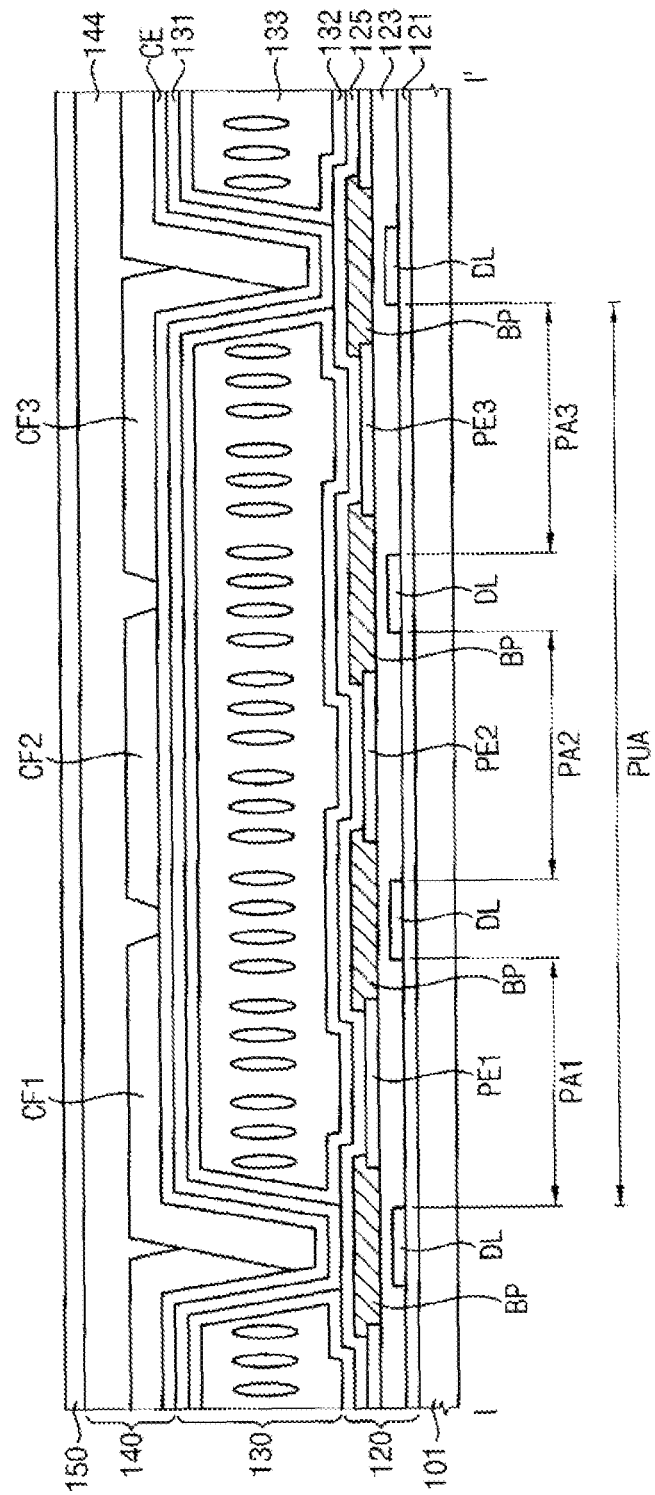
FIG. 7 is a cross-sectional view illustrating a display apparatus according to an exemplary embodiment of the present invention.

FIG. 7 is a cross-sectional view illustrating a display apparatus according to an exemplary embodiment of the present invention.

A display apparatus according to an exemplary embodiment is substantially the same as the display substrate according to the previous exemplary embodiment of FIGS. 1 and 2 excepting for light blocking patterns, and thus the same reference numerals may be used to refer to the same or like parts as those described in the previous exemplary embodiment of FIGS. 1 and 2 and any repetitive explanation concerning the above elements may be omitted.

Referring to FIGS. 1 and 7, the display apparatus includes a base substrate 101, a thin film transistor (TFT) array layer 120, a capsular structure layer 130, a color filter layer 140 and a protecting layer 150. The TFT array layer 120, the capsular structure layer 130, the color filter layer 140 and the protecting layer 150 are formed on the base substrate 101.

The TFT array layer 120 includes a plurality of gate lines GL, a plurality of data lines DL, a plurality of switching elements TR, a plurality of pixel electrodes PE and a plurality of light blocking patterns BP. The gate lines GL, the data lines DL, the switching elements TR and the pixel electrodes PE are substantially the same as those shown in FIGS. 1 and 2, and thus any repetitive explanation concerning the above elements may be omitted.

The light blocking patterns BP are disposed on the base substrate 101 on which the pixel electrodes PE are formed. The light blocking patterns BP are disposed between adjacent pixel electrodes PE1, PE2 and PE3. For example, the light blocking patterns BP are disposed in a region in which the data lines DL and the gate lines GL are formed. The light blocking patterns BP may be overlapped with the data and gate lines DL and GL.

The capsular structure layer 130, the color filter layer 140 and the protecting layer 150 may be formed on the base substrate 101 on which the light blocking patterns BP are formed.

The capsular structure layer 130, the color filter layer 140 and the protecting layer 150 are substantially the same as shown in FIGS. 1 and 2, and thus any repetitive explanations concerning the elements may be omitted.

Figure 8B:
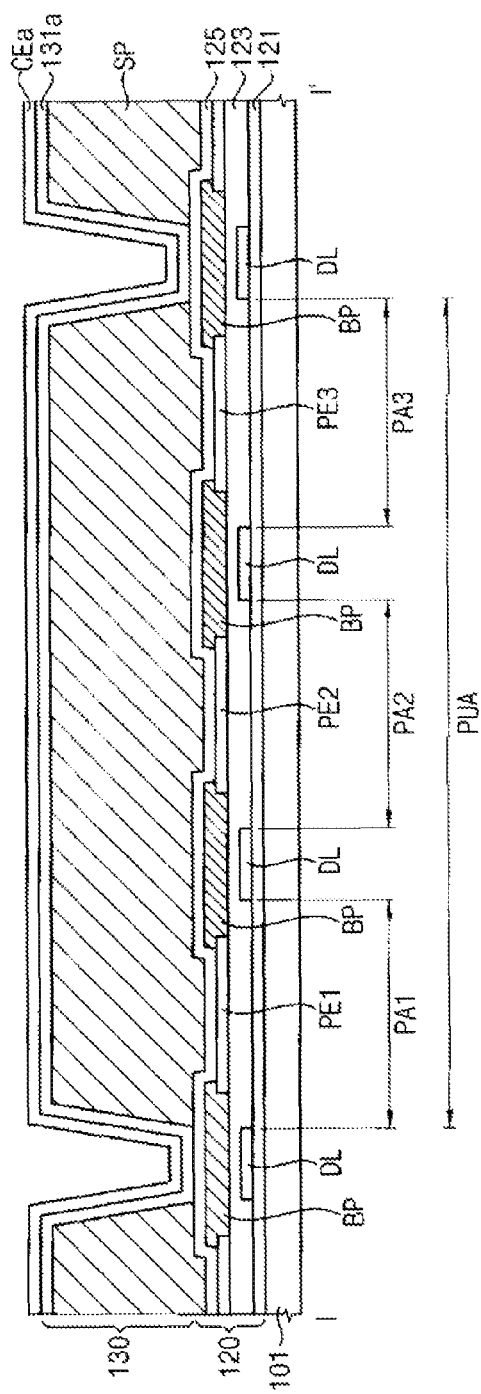
Figure 8C:
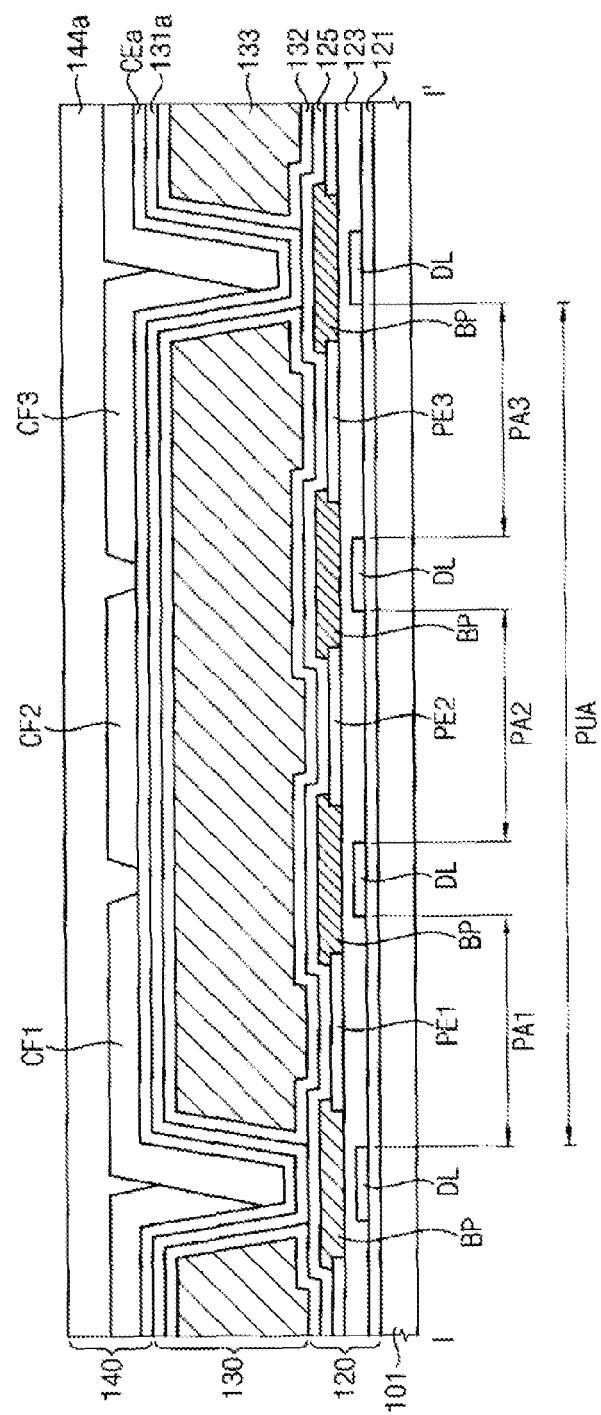

FIGS. 8A to 8C are cross-sectional views illustrating the display apparatus shown in FIG. 7. A method according to an exemplary embodiment is substantially the same as of the method discussed above with respect to FIGS. 1 to 3E excepting for light blocking patterns BP, and thus the same reference numerals may be used to refer to the same or like parts as those described above with respect to FIGS. 1 to 3E and any repetitive explanation concerning the above elements may be omitted.

Referring to FIGS. 1, 7 and 8A, the TFT array layer 120 is formed on the base substrate 101.

For example, a first metal pattern including the gate lines GL and gate electrodes GE is formed on the base substrate 101. A first insulating layer 121 is formed on the base substrate 101 on which the first metal pattern is formed. Active patterns of the switching elements TR are formed on the base substrate 101 on which the first insulating layer 121 is formed. A second metal pattern including the data lines DL, source electrodes SE and drain electrodes DE is formed on the base substrate 101 on which the active patterns are formed. A second insulating layer 123 having contact holes CH is formed on the base substrate 101 on which the second metal pattern is formed. The first, second and third pixel electrodes PE1, PE2 and PE3 are formed in the first, second and third sub pixel regions, respectively, on the base substrate 101 on which the second insulating layer 123 having the contact holes CH are formed.

A light blocking layer is formed on the base substrate 101 on which the first, second and third pixel electrodes PE1, PE2 and PE3 are formed. The light blocking layer may include metal, and may be patterned through a photolithography process. The light blocking layer is patterned forming the light blocking patterns BP between the first, second and third pixel electrodes PE1, PE2 and PE3. The light blocking patterns BP may be formed in a region between adjacent pixel electrodes in a first direction D1. Alternatively, the light blocking patterns BP may be formed in a region between adjacent pixel electrodes in a second direction D2 crossing the first direction D1.

A third insulating layer 125 is formed on the base substrate 101 on which the light blocking patterns BP are formed. Thus, the TFT array layer 120 is completed.

Referring to FIGS. 7 and 8B, a plurality of removing patterns SP, a plurality of capsular structures 131a and a transparent conductive layer CEa are shown.

Referring to FIGS. 7 and 8C, the first, second and third color filters CF1, CF2 and CF3 are formed in the first, second and third sub pixel regions PA1, PA2 and PA3, respectively, on the base substrate 101 on which the transparent conductive layer CEa is formed.

A planarizing insulating layer 144a is formed on the base substrate 101 on which the first, second and third color filters CF1, CF2 and CF3 are formed.

Subsequent processes for manufacturing the display apparatus of FIG. 7 are substantially the same as shown in FIGS. 3D and 3E. Thus, any repetitive explanations concerning the processes may be omitted.

According to an exemplary embodiment of the present invention, a plurality of the capsular structures is formed on the pixel regions, and each of the capsular structures is formed on a plurality of the sub pixel regions so that opening ratio is increased. Thus, light transmittance and luminance of the display apparatus may be increased.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and aspects of the present invention.

What is claimed is:

1. A display apparatus comprising:
  a base substrate comprising a plurality of unit pixel regions, each unit pixel region of the plurality of unit pixel regions comprising a plurality of sub pixel regions;
  a pixel electrode formed in each of the sub pixel regions of the plurality of sub pixel regions for each unit pixel region of the plurality of unit pixel regions;
  a plurality of capsular structures disposed on the base substrate, each capsular structure of the plurality of capsular structures being formed in each of the unit pixel regions of the plurality of unit pixel regions, each capsular structure of the plurality of capsular structures having a cavity;
  a common electrode formed on the plurality of capsular structures; and
  a plurality of color filters formed on the plurality of capsular structures, each of the color filters of the plurality of color filters being formed in each of the sub pixel regions of the plurality of sub pixel regions for each unit pixel region of the plurality of unit pixel regions.

2. The display apparatus of claim 1, further comprising a light blocking pattern formed between adjacent color filters of the plurality of color filters.

3. The display apparatus of claim 2, wherein the light blocking pattern comprises opaque organic material.

4. The display apparatus of claim 3, wherein the light blocking pattern is disposed on the plurality of color filters.

5. The display apparatus of claim 3, wherein the light blocking pattern comprises:
  a first black matrix interposed between adjacent capsular structures of the plurality of capsular structures, and being partially overlapped with the plurality of color filters, the first black matrix being disposed under the plurality of color filters; and
  a second black matrix formed on the plurality of capsular structures, and being partially overlapped with the plurality of color filters, the second black matrix being disposed on top of the plurality of color filters.

6. The display apparatus of claim 2, wherein the light blocking pattern is interposed between the plurality of capsular structures and the base substrate.

7. The display apparatus of claim 6, wherein the light blocking pattern comprises a metal.

8. The display apparatus of claim 2, wherein each of the sub pixel regions of the plurality of sub pixel regions in each of the unit pixel regions of the plurality of unit pixel regions are arranged in a first direction, and
  the common electrode is extended in the first direction and arranged in a second direction different than the first direction.

9. The display apparatus of claim 8, wherein each of the plurality of capsular structures adjacent to each other in the first direction are connected to each other, and each of the plurality of capsular structures adjacent to each other in the second direction are spaced apart from each other.

10. The display apparatus of claim 2, further comprising:
  an alignment layer disposed on an upper surface of the cavity of each capsular structure of the plurality of capsular structures; and a liquid crystal layer disposed in the cavity of each capsular structure of the plurality of capsular structures and aligned by the alignment layer.

11. The display apparatus of claim 10, further comprising a protecting layer sealing the liquid crystal layer.

12. A method of manufacturing a display apparatus, the method comprising:

forming a plurality of pixel electrodes in a plurality of sub pixel regions of a base substrate;

forming a removing pattern in each of a plurality of unit pixel regions, each of the unit pixel regions comprising a plurality of the sub pixel regions of the plurality of sub pixel regions of the base substrate, the removing pattern having substantially the same width as each of the unit pixel regions of the plurality of unit pixel regions, the removing pattern being extended in a longitudinal direction that crosses a horizontal direction of each of the unit pixel regions of the plurality of unit pixel regions;

forming a plurality of capsular structures and a common electrode on the removing pattern of each of the plurality of unit pixel regions, each of the plurality of capsular structures being extended in a width direction of the removing pattern and spaced apart from each other in the longitudinal direction of the removing pattern;

removing the removing patterns and forming cavities in each of the plurality of capsular structures;

forming a liquid crystal layer in each of the cavities of each of the plurality of capsular structures; and forming a protecting layer and sealing the liquid crystal layer in each of the cavities of each of the plurality of capsular structures.

13. The method of claim 12, further comprising forming a plurality of color filters on the plurality of capsular structures, the plurality of color filters corresponding to the plurality of sub pixel regions for each unit pixel region of the plurality of unit pixel regions.

14. The method of claim 13, further comprising forming a light blocking pattern between adjacent color filters of the plurality of color filters having different colors.

15. The method of claim 14, wherein the light blocking pattern comprises an opaque organic material.

16. The method of claim 15, wherein the light blocking pattern is formed on the plurality of color filters, and is partially overlapped with the plurality of color filters.

17. The method of claim 15, wherein the light blocking pattern is formed by:

forming a first black matrix between adjacent capsular structures of the plurality of capsular structures prior to forming the plurality of color filters; and forming a second black matrix on the plurality of capsular structures after forming the plurality of color filters.

18. The method of claim 12, further comprising forming a light blocking pattern, prior to forming the pixel electrodes.

19. The method of claim 18, wherein the light blocking pattern comprises a metal.

20. The method of claim 12, further comprising:

forming an alignment layer in each of the cavities of each of the plurality of capsular structures; and forming a light crystal layer in each of the cavities each of the plurality of capsular structures in which the alignment layer is formed.

21. A display apparatus comprising:

a base substrate, a plurality of unit pixel regions being defined on the base substrate;

a plurality of pixel electrode corresponding to the plurality of unit pixel regions, each of the unit pixel regions having a plurality of sub pixel regions;

a plurality of capsular structures disposed on the base substrate, each capsular structure of the plurality of capsular structures being formed in each of the plurality of unit pixel regions, each capsular structure of the plurality of capsular structures having a cavity;

a common electrode formed on the plurality of capsular structures; and a plurality of color filters formed on the plurality of capsular structures, each of the color filters of the plurality of color filters being formed in each of the sub pixel regions of the plurality of sub pixel region.

* * * * *